Figure 1:
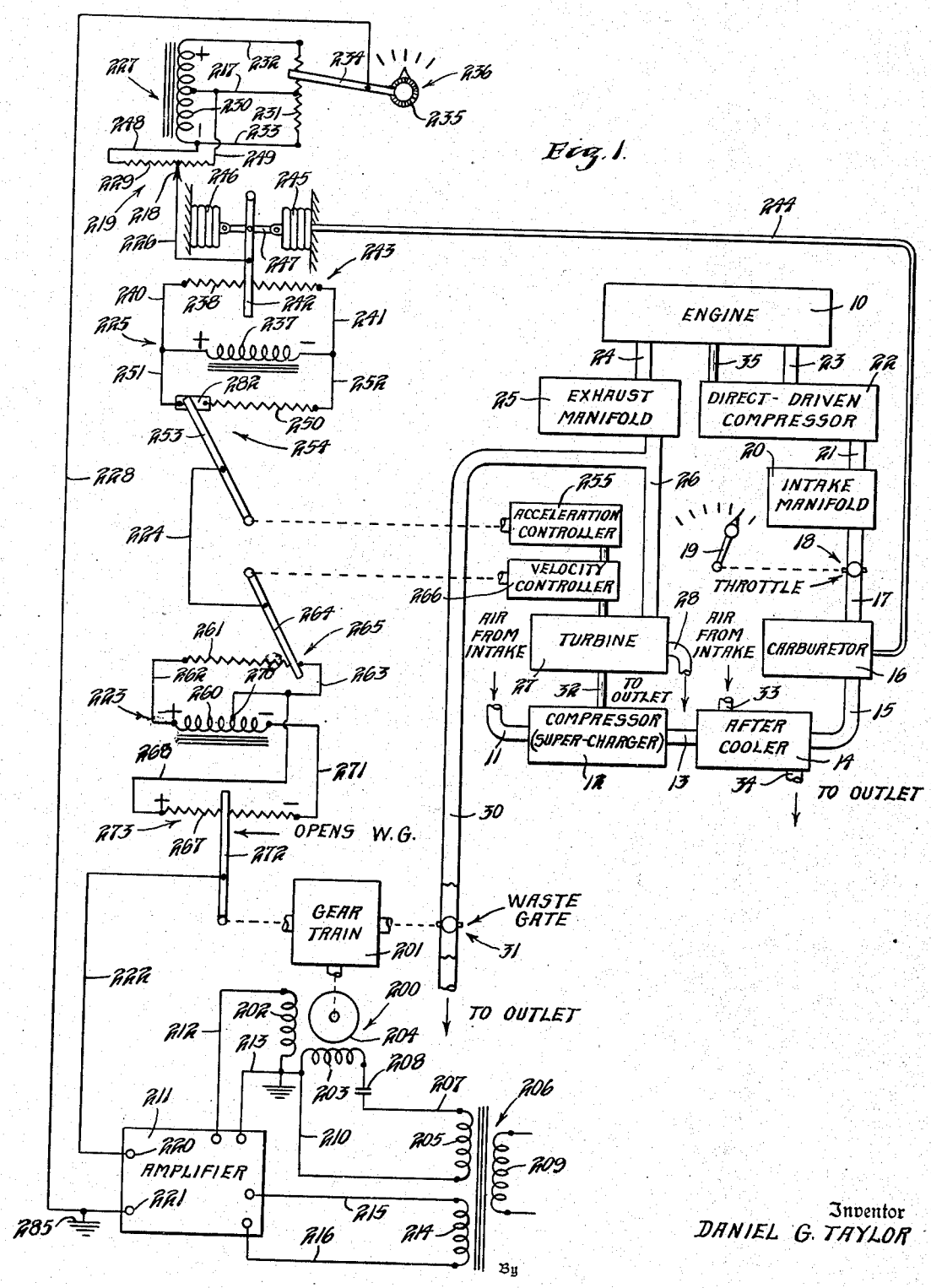

Inventor
DANIEL G. TAYLOR

George H. Fisher
Attorney

Nov. 6, 1945.　　　　D. G. TAYLOR　　　　2,388,350
CONTROL APPARATUS
Filed Feb. 22, 1943　　　　2 Sheets-Sheet 2
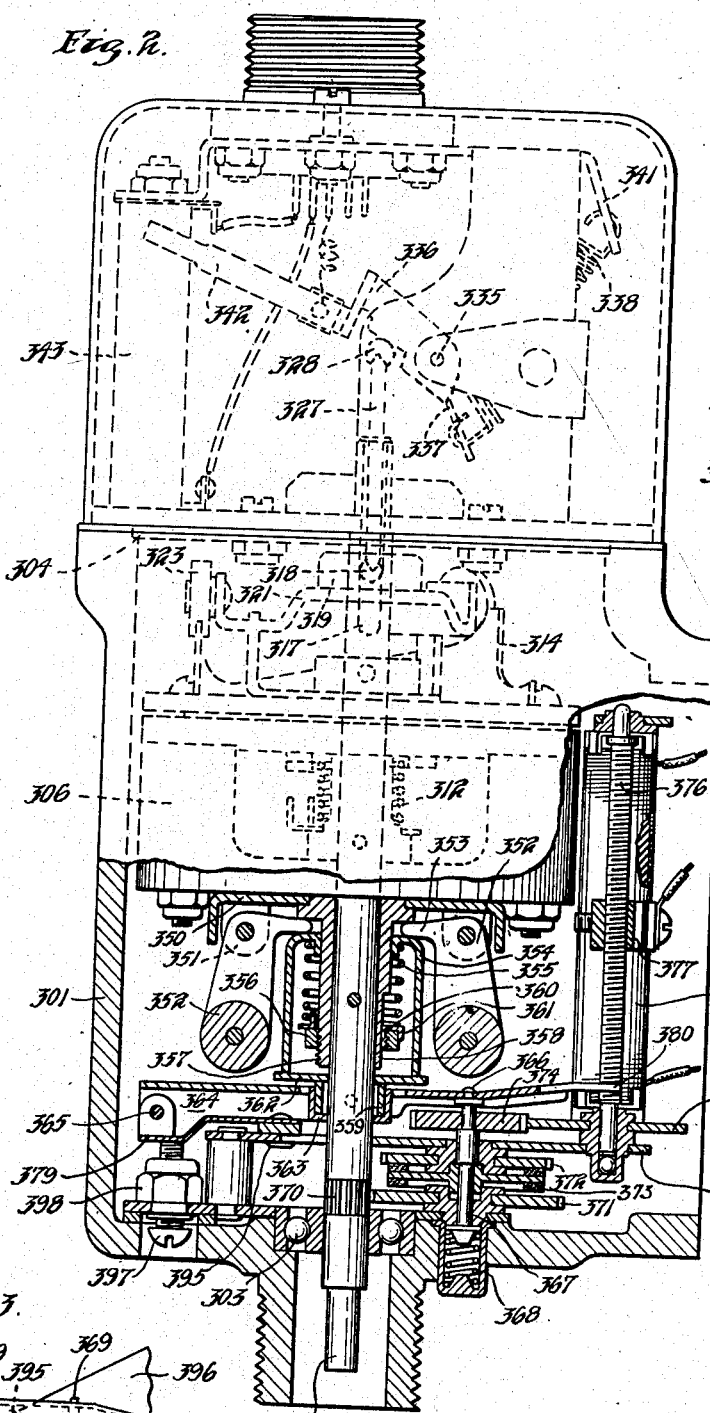
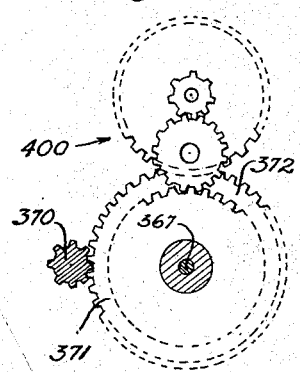
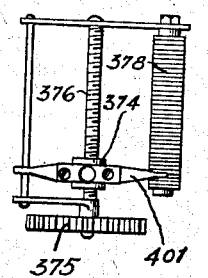
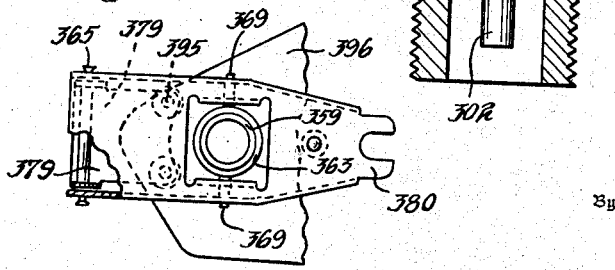
Inventor
DANIEL G. TAYLOR
By George H. Fisher
Attorney Patented Nov. 6, 1945

2,388,350

UNITED STATES PATENT OFFICE 2,388,350

CONTROL APPARATUS

Daniel G. Taylor, Minneapolis, Minn., assignor to Minneapolis-Honeywell Regulator Company, Minneapolis, Minn., a corporation of Delaware Application February 22, 1943, Serial No. 476,802

5 Claims. (Cl. 230—5)

The present invention relates to control apparatus, and particularly to apparatus for controlling the pressure of the air supplied to the intake manifold of an internal combustion engine.

Internal combustion engines for use on aircraft are sometimes equipped with a compressor driven by a turbine which is powered by the exhaust gases of the engine. Such a compressor is termed a supercharger, and is used for supplying air at a pressure greater than atmospheric to the intake manifold of the engine. Such a compressor may be controlled by a waste gate, or damper which by-passes more or less of the exhaust gases from the engine to the atmosphere, thereby controlling the amount of power supplied to the turbine.

When an automatically controlled supercharger is used, it is desirable to provide means for limiting the speed of the supercharger. A speed limiting controller is therefore employed in the system which controls the waste gate. Such a controller operates to cause the waste gate to move towards its open position whenever the turbine speed increases above a predetermined value. In the co-pending application of Hubert T. Sparrow Serial No. 476,797, filed February 22, 1943, there is shown and claimed a system including a speed limiting controller which operates in accordance with an integrated time function of the turbine speed.

I have found that, in operating such a speed limiting controller, it is desirable that the response of the controller be very rapid when the speed exceeds its limit, in order to provide adequate protection of the turbine. On the other hand, in order to eliminate overshooting tendencies, the response of the controller should be slower when the turbine speed is below its limit.

It is an object of this invention to provide, in an intake manifold pressure control system including a supercharger, improved means for limiting the speed of the supercharger.

A further object of the present invention is to provide an improvement for a control system of the type shown and described in the above-mentioned co-pending application of Hubert T. Sparrow. The particular improvement claimed in the present application is shown but not claimed in the Sparrow application.

A further object of the present invention is to provide a controller responsive to the velocity of a rotating shaft and operating to produce a speed-reducing control effect which increases at a certain rate when the shaft speed exceeds a predetermined value, and decreases at a lower rate when the speed of the shaft is below that predetermined value.

Other objects and advantages of the present invention will become apparent from a consideration of the appended specification, claims and drawings, in which Figure 1 represents, somewhat diagrammatically, a control system in which my invention may be utilized, Figure 2 is a cross-sectional view of a control device by means of which the principles of my invention may be applied to the system disclosed in Figure 1, and Figures 3, 4 and 5 illustrate details of the device shown in Figure 2.

Figure 1

There is shown in Figure 1 an electrical control system, which operates to control the pressure of the air supplied to the intake manifold of an internal combustion engine 10, which may be located in an aircraft.

The internal combustion engine 10 is supplied with combustion supporting air from an intake, not shown in the drawings, and preferably located in the leading edge of a wing of the aircraft in which the engine 10 is mounted. In the air induction system, as schematically shown in the drawings, air from the intake passes through a conduit 11, a compressor 12, a conduit 13, an after-cooler 14, a conduit 15, a carburetor 16, a conduit 17 in which a throttle valve 18 is located, an intake manifold 20, a conduit 21, a direct driven compressor 22, and a conduit 23 to the engine 10.

In the exhaust system, as schematically shown in the drawings, the exhaust gases from the engine 10 pass out through a conduit 24, an exhaust manifold 25, a conduit 26, a turbine 27, and a conduit 28 to a suitable outlet, not shown in the drawings. A conduit 30 connects the conduit 26 with the outlet, and a waste gate 31 is located in the conduit 30. A portion of the exhaust gases from the engine 10 is by-passed to the atmosphere through the waste gate, and the remainder is used in the turbine to produce power for operating the compressor 12. By positioning the waste gate, the proportion of the total exhaust gases used in the turbine 27 may be varied and hence the speed of the turbine and compressor may be controlled by positioning the waste gate.

The compressor 12 is driven by the turbine through a shaft 32. Since the air leaving the compressor 12 has a very high temperature, due to the heat of compression, it is necessary to provide means for cooling it. Such a means is the after-cooler 14, in which the heated air discharged from the turbine is passed in heat exchange relationship with the fresh air. The cooling air is received from the intake through a conduit 33, and after passing through the after-cooler is discharged to the outlet through a conduit 34.

In the carburetor 16, fuel from a suitable source (not shown) is mixed with the air. The throttle 18 may be manipulated by a manually movable lever 19. The throttle is usually located inside the carburetor, but has been shown separately for the sake of clarity in the drawings.

The direct-driven compressor 22 is driven by the engine 10 through a shaft 35, and in some engines serves not only as a compressor but as a distributor of the fuel and air mixture to the engine cylinders. Although I have shown the direct-driven compressor 22 and the intake manifold 20 as separate units, in most aircraft engines the direct-driven compressor is located inside the housing of the intake manifold.

The waste gate 31 is driven by a motor 200 through a gear train 201. The motor 200 is of the split phase type, being provided with a pair of field windings 202 and 203, which are spaced 90 electrical degrees apart, and an armature 204. The field winding 203 is supplied with electrical energy from a secondary winding 205 of a transformer 206. The energizing circuit for winding 203 may be traced from the upper terminal of secondary winding 205 through a conductor 207, a condenser 208, motor field winding 203, and a conductor 210 to the lower terminal of secondary winding 205.

The flow of electrical energy to the field winding 202 is controlled by an amplifier 211, through a pair of conductors 212 and 213. The amplifier 211 is supplied with electrical energy from another secondary winding 214 on the transformer 206. The amplifier 211 is connected to the secondary winding 214 through a pair of conductors 215 and 216.

The amplifier 211 is provided with a pair of signal input terminals 220 and 221, and operates to supply the motor field winding 202 with alternating current of a phase dependent upon the phase of an alternating signal impressed upon the input terminals 220 and 221. Any suitable amplifier having such a characteristic may be used, but I prefer to use one of the type shown in Figure 1 of the co-pending application of Albert P. Upton, Serial No. 437,561, filed April 3, 1942.

It will be seen that if the motor field winding 202 is supplied with alternating current which leads the current supplied to winding 203 by 90°, the motor 200 will rotate in one direction, while if the field winding 202 is supplied with current which lags the current in winding 203 by 90°, the motor 200 operates in the opposite direction.

The signal potential applied to the input terminals 220 and 221 of amplifier 211 is determined by the electrical conditions existing in a compound network, which consists of three electrical networks connected in series. The circuit between the amplifier input terminals 220 and 221 may be traced from terminal 220 through a conductor 222, a first electrical network 223, a conductor 224, a second electrical network 225, a conductor 226, a third electrical network 227, and a conductor 228 to amplifier input terminal 221.

The network 227 includes a transformer secondary winding 230, across whose terminals is connected a slidewire resistance 231, by means of conductors 232 and 233. The conductor 228 is connected to a slider 234 which cooperates with resistance 231, and is movable therealong by operation of a knob 235. The slider 234 and the resistance 231 together comprise a control point adjuster 236 for the intake manifold pressure control system.

Another resistance 229 has one of its terminals connected by a conductor 248 to the lower terminal of secondary winding 230, and its opposite terminal is connected through a conductor 249 to a center tap on secondary winding 230. A slider 218 cooperates with the slidewire resistance 229, and is manually adjustable with respect to that slidewire. The slider 218 and the resistance 229 together form a calibrating potentiometer 219. The center tap on winding 230 is connected to the center of resistance 231 by a conductor 217. The conductor 217 is provided to decrease the impedance of the network between slider 234 and slider 218, and does not otherwise affect the operation of the system.

The electrical network 225 includes a secondary winding 237, across whose terminals is connected a slidewire resistance 238 by means of conductors 240 and 241. A slider 242 cooperates with resistance 238, and is connected to conductor 226. The slider 242 and resistance 238 together form a main controller 243. The main controller 243 is operated in accordance with the absolute pressure existing within the carburetor 16. A pressure take-off duct 244 connects the carburetor 16 with the interior of a bellows 245. A second bellows 246 is evacuated, so that its expansion and contraction depends only upon atmospheric pressure. The two bellows 245 and 246 are mounted with their free ends extending toward each other, and those free ends are connected by a link 247. A center point on the link 247 is connected as by a pin and slot connection with the slider 242.

A second slidewire resistance 250 is also connected across the terminals of secondary winding 237, through conductors 251 and 252. A slider 253 cooperates with the resistance 250 and is connected to conductor 224. The resistance 250 and slider 253 together form an acceleration compensating controller 254. The controller 254 is operated in accordance with the acceleration of the turbine shaft 32 by an acceleration responsive control device schematically indicated at 255. The acceleration responsive control device 255 is shown in more detail in Figure 2. For the present purposes, it may be stated that the slider 253 is maintained in the position shown in the drawings as long as the shaft 32 rotates at a constant speed. Upon acceleration of the shaft 32, the slider 253 is moved to the right along resistance 250. A contact 282 provides a "dead spot" at the left end of resistance 250, so that small accelerations of the turbine 27 have no effect on the control system.

The network 223 includes a transformer secondary winding 260. A slidewire resistance 261 is connected by a conductor 262 to one terminal of secondary winding 260 and by a conductor 263 to a tap 270 at an intermediate point on secondary winding 260. A slider 264 cooperates with resistance 261 and is connected to conductor 224. The slider 264 and resistance 261 together form a velocity responsive compensating controller 265, which is operated by a velocity responsive control device schematically indicated at 266, and described in detail in connection with Figure 2. The slider 264 is moved over the resistance 261 by the velocity responsive control device 266 in accordance with an integrated time function of the velocity of shaft 32, as described more completely in connection with Figure 2.

The network 223 also includes a slidewire resistance 267. The left terminal of resistance 267 is connected through conductors 268 and 263 to the tap 270 on secondary winding 260. The right terminal of resistance 267 is connected through a conductor 271 to the right terminal of secondary winding 260. A slider 272 cooperates with resistance 267, and is connected to conductor 222. The slider 272 and resistance 267 together form a follow-up potentiometer 273. The slider 272 is moved along resistance 267 by the motor 200, acting through the gear train 201, and concurrently with the movement of the waste gate 31.

Operation of Figure 1

All the secondary windings 230, 237 and 260 are on the same transformer, which may be the transformer 206. Therefore, the alternating potentials at the terminals of these transformer windings are in phase with each other. The signal potential impressed on the input terminals 220 and 221 of amplifier 211 is the algebraic sum of a number of potentials produced in the networks 223, 225 and 227.

For the sake of convenience in considering the operation of this circuit, let us consider only the potential conditions existing during a half cycle when the terminals of the transformer windings have the polarities indicated by the legends in the drawings. In other words, the left-hand terminals of windings 237 and 260 are considered as positive and the upper terminal of secondary winding 230 is considered as positive. In order to have a reference potential, the conductor 228 is considered as being grounded at 285.

Considering first the network 227, it will be seen that when the slider 234 is in the position shown in the drawings, it is above the center of resistance 231, and hence its potential is positive with respect to that center. On the other hand, the slider 218 is at an intermediate point along the resistance 229, and hence its potential is negative with respect to the center tap on winding 230. It may therefore be seen that the network 227 introduces a potential into the series circuit connecting the amplifier input terminals, which potential is of a polarity such that slider 218 and conductor 226 are made negative with respect to the grounded conductor 228.

Considering next the network 225, it will be seen that, with the sliders 242 and 253 in the positions shown in the drawings, the network 225 introduces into the series circuit a potential equal to the potential of slider 242 with respect to the left terminal of secondary winding 237.

This potential is of a polarity such that slider 253 is positive with respect to slider 242. The potential of slider 253 with respect to ground depends upon the relative magnitudes of the opposing potentials introduced by the networks 227 and 225. For the purposes of the present discussion, it may be assumed that the potential introduced by network 225 is slightly larger than that introduced by network 227, and that hence slider 253 is positive with respect to ground.

Considering now the network 223, it will be seen that since slider 264 is at the extreme right end of its associated resistance 261, the conductor 263 is at the same positive potential with respect to ground as slider 253. The resistance 267 is connected across a portion of secondary winding 260 in such a manner that its left terminal is more positive than its right terminal. Since the slider 272 is at the center position along resistance 267, then the potential introduced into the series circuit is the potential between slider 272 and the left terminal of resistance 267. The network 223 therefore introduces a negative potential into the series circuit. Under balanced conditions, this negative potential has the same magnitude as the positive potential of slider 253 with respect to ground. The two potentials then oppose each other, so that the input terminal of 220 is at the same ground potential as input terminal 221 of amplifier 211. Therefore, no energy is supplied to the field winding 202 of motor 200 by the amplifier 211 which is effective to cause rotation of motor 200. Accordingly, the waste gate remains stationary and the compound network, including the three networks 223, 225 and 227 remain balanced.

Consider now the operation of the system when the sliders 234, 218, 253 and 264 remain in the positions shown in the drawings, and the pressure in the carburetor 16 increases. Such an increase in pressure in the carburetor 16 is transmitted to the bellows 245, where it causes slider 242 to move to the left along resistance 238. This reduces the magnitude of the positive potential introduced into the compound network by network 225. The positive potential in the compound network is then less than the sum of negative potentials introduced by the networks 227 and 223, and hence the amplifier input terminal 220 is negative with respect to input terminal 221. Let it be assumed that the connections of the amplifier are such that when a signal potential of this polarity, or phase, is applied to the amplifier input terminals, the motor field winding 202 is supplied with alternating current of such a phase that the motor 200 then operates in the proper direction to move the waste gate towards open position. At the same time, operation of the motor 200 in this direction causes a movement of slider 272 to the left along resistance 267.

The opening movement of the waste gate 31 reduces the pressure differential across the turbine 27 and thereby reduces the speed of the compressor 12 driven by the turbine. The reduction in the speed of the compressor lowers its compression ratio, thereby reducing the pressure of the air supplied to the carburetor 16 and transmitted to the bellows 245. At the same time, the movement of slider 272 to the left along resistance 267 reduces the balancing potential introduced into the compound network. This movement of slider 272 and of the waste gate continues until the positive potential introduced by controller 243 is exactly balanced by the sum of the potential introduced by network 227 and the balancing potential introduced by the follow-up controller 273, whereupon the motor 200 stops.

In a similar manner, it may be understood that a decrease in the pressure in the carburetor 16 causes movement of slider 242 to the right along resistance 238, and thereby introduces into the compound series network a potential having a polarity such that it tends to make amplifier input terminal 220 positive with respect to input terminal 221. This causes operation of the motor 220 in a direction to close the waste gate and to move slider 272 to the right along resistance 267, thereby increasing the balancing potential provided by follow-up potentiometer 273, and at the same time increasing the pressure in the carburetor 16 to reduce the unbalancing potential due to the motion of slider 242.

Consider now the operation of the system when the sliders 234, 218, 242, and 264 remain in the positions shown in the drawings, and the slider 253 moves to the right along resistance 250 due to an excessive acceleration of the shaft 32. It will be seen that such a movement of slider 253 introduces into the series compound network a potential such that the input terminal 220 of amplifier 211 is rendered increasingly negative with respect to input terminal 221. As previously described, a signal potential having such polarity applied to the input terminals of amplifier 211 causes the waste gate to move towards open position, thereby reducing the speed of the turbine and compressor, and causing movement of slider 272 to the left to rebalance the compound network.

Considering the effect of movement of slider 264 to the left along resistance 261 at a time when the sliders 234, 218, 242 and 253 are stationary, it will be seen that such a motion of slider 264 introduces a potential into the series network which tends to make amplifier input terminal 220 instantaneously negative with respect to input terminal 221. As before, such a signal potential causes a movement of the waste gate toward open position to reduce the speed of the turbine and compressor and a movement of slider 272 to the left to rebalance the control network.

There remains to be considered the effect of the network 227 on the operation of the control system when the sliders 242, 253 and 264 are stationary at the positions shown in the drawings. If the slider 234 is moved upwardly along resistance 231, the potential introduced into the network is such as to make amplifier input terminal 220 negative with respect to terminal 221, thereby causing an opening movement of the waste gate and a decrease in the intake manifold pressure. On the other hand, a downward movement of slider 234 from the position shown in the drawings makes amplifier input terminal 220 more positive than terminal 221, thereby causing operation of the waste gate toward closed position and increasing the pressure in the carburetor 16.

Depending upon the power output required from the engine, it may be desired to select any value of intake manifold pressure over a wide range, which may extend, for example, from 17 to 46" of mercury. This may be termed the operating range of the system. The main controller 243 is therefore designed to move from one end of its associated resistance to the opposite end as the intake manifold pressure varies from 17 to 46" of mercury. Also, it is desired that, once a particular value for the intake manifold pressure has been selected, that the waste gate be operated throughout its range of movement as the manifold pressure varies over a smaller range extending on either side of the selected pressure. This smaller range may be termed the throttling range of the system. The transformer secondary winding 231 which supplies potential to the terminals of resistance 238 is therefore proportioned with respect to the section of secondary winding 260 which supplies potential to the terminals of resistance 261, that a movement of slider 242 over a fraction of its total range of travel causes a following movement of slider 272 from one end of its range of movement to the other. If the operating range is 29 inches, as set forth in the example above, and the throttling range is 11.6 inches, then the voltage supplied to the terminals of resistance 261 should be 0.4 times the voltage supplied to the terminals of resistance 238.

The transformer winding 230, which supplies the network 227, is so proportioned with respect to windings 237 and 260, that a change in the position of slider 234 from one end of resistance 231 to the other will change the value of pressure at the carburetor which causes the system to be balanced, if the position of the waste gate is assumed fixed, from one end of the control range to the other.

In other words, if all the resistances 231, 238, and 261 are equal in resistance and in length, then the terminal voltages of winding 230 and 237 should be approximately equal, and the voltage across the section of winding 260 which supplies resistance 261 should be smaller, depending upon the ratio desired between the throttling range and the overall operating range of the system.

*Figure 2*

There is shown in Figure 2 a control device which includes an acceleration responsive controller which may be used as the controller 255 of Figure 1, and a velocity responsive controller which may be used as the controller 266 of Figure 1. The details of the acceleration responsive controller form no part of the present invention, but are shown and claimed in my co-pending application, Serial No. 476,801, filed February 22, 1943. The details of the particular velocity responsive controller shown in Figure 2 also form no part of the present invention, but are shown and claimed in the co-pending joint application of Hubert T. Sparrow, Daniel G. Taylor, and Glenn H. Witts, Serial No. 486,828, filed May 13, 1943.

Referring to Figure 2, there is shown a housing 301, having an aperture in the central portion of its base, through which aperture passes a shaft 302, the lower end of which is keyed or otherwise adapted for operative connection with an extension of the shaft 32 of turbine 27. The center portion of the base of casing 301 includes a bearing 303 in which the shaft 302 is journalled. The casing 301 is provided with a cover 304 carrying a bearing (not shown) in which bearing the upper end of the shaft 302 is journalled.

*Acceleration responsive controller*

A mass 306, having a hollow of generally cylindrical form is rotatably mounted on the shaft 302 and is resiliently driven thereby through a coil spring 312. When the shaft 302 is rotating at a constant speed, the angular position of the mass 306 with respect to the shaft 302 does not change, but upon acceleration of the shaft 302 the mass 306 changes its angular position with respect to the shaft 302 because of its inertia. The spring 312 permits a limited amount of relative movement of the shaft 302 and mass 306, and biases the mass 306 so that it always returns to the same angular position with respect to shaft 302.

A cylindrical cam member 314 is adjustably supported on the mass 306 by means described in detail in my co-pending application, previously referred to.

The shaft 302 is slotted, as at 317. The portion of shaft 302 above the slot 317 is hollow. A pin 318 passes through the slot 317, and has its opposite ends fixed in a collar 319, which is slidable along the shaft 302, but because of the pin 318 and slot 317, the collar 319 is not rotatable with respect to shaft 302.

The collar 319 carries a spider comprising a plurality of arms 321, each of which has a bent-up extremity, and in that extremity carries a stub shaft on which rotates a roller follower 323 for cooperation with the cylindrical cam 314. In the structure shown in the drawings, there are three arms 321 on the spider. The cam member 134 is circumferentially divided into three similar cam portions, having a gradual rise from the lowest point thereon to the highest point thereon. At the high point of the cam, the cam surface suddenly rises, terminating at a point where it is almost vertical, thereby limiting the angular movement of the cam with respect to the follower assembly, which includes the spider arms 321 and the followers 323.

Within the hollow portion of the shaft 302 above the pin 318, there moves a thrust rod 327. The thrust rod 327 is tapered at both ends to fit into craters in the pin 318 and in a cross head 328, pivotally mounted at 335. A bracket 336 extends into the path of movement of the cross head 328. The right-hand portion of the bracket 336 terminates in a tongue 337. A tension spring 338 is stretched between the tongue 337 and a stationary tongue 340. The spring 338 biases the bracket 336 for counter-clockwise rotation about the pivot 335, thereby maintaining the bracket 336 in engagement with the cross head 328.

The left end of bracket 336 insulatingly carries a slider 342. The extremity of slider 342 cooperates with a slidewire resistance 343, which is mounted on the cover 304 of the casing 301.

*Operation of acceleration responsive controller*

The shaft 302 may be assumed to rotate in a counterclockwise direction as viewed from the bottom in Figure 2.

When the shaft 302 is rotating at a constant velocity, the angular position of the mass 306 relative to the shaft 302 is such that the followers 323 rest in the lower portions of the cam member 314. At that time, the pin 318 is at the bottom of the slot 137, and the slider 342 is at or near the lower end of the slidewire resistance 343.

Upon acceleration of the shaft 302, relative movement takes place between the mass 306 and the shaft 302, as previously explained. Since the cam 314 is fixed to the mass 306, and since the followers 323 move angularly with the shaft 302, the relative motion of the mass 306 and shaft 302 causes the followers 323 to be moved up the surfaces on the cam member 314, thereby moving the pin 318, the thrust rod 327, and the slider 342 upwardly. Movement of the slider 342 in an upward direction is equivalent to the movement of slider 253 of Figure 1 to the right along resistance 250.

*Velocity responsive controller*

A plate 350 is fixed on the shaft 302 just below the mass 306. The plate 350 is provided with diametrically opposite pairs of downwardly extendings ears 351. In each of the pairs of ears 351 is journalled a shaft on which is carried a weight 352. Extensions 353 on each of the weights 352 extend toward the shaft 302, so as to provide a sort of bell-crank lever arrangement. The extensions 353 on the weights 352 engage the upper surface of a housing 354, which is slidable on the shaft 302. A compression spring 355 is carried within the housing 354 and between the top of the housing and a nut 356, which is threaded on a sleeve 357 fixed on the shaft 302. The sleeve 357 is flattened along one side, as indicated at 358. A washer 360 retains the spring 355 between the nut 356 and the housing 354. The aperture in the washer 360 is shaped to conform with the sleeve 358, so that the washer is not rotatable on the sleeve. The washer 360 has a down struck lug 361 at one side thereof which engages one of the exterior surfaces of the nut 356 and prevents rotation of the latter.

When it is desired to adjust the tension in the spring 355, the washer 360 may be forced upwardly, freeing the down struck lug 361 from engagement with the nut, whereupon the nut 356 may be rotated on the sleeve 357. After the nut has been moved to its desired position, the washer 360 may again be released, allowing the lug 361 to again engage nut 356 and lock it against rotation.

The lower portion of the housing 354 is attached to a plate 362, which bears against a sleeve 359, nested with a cup-shaped member 363. The sleeve 359 is preferably made of Bakelite, or other suitable wear resisting material. The cup-shaped member 363 is pivotally mounted on a pair of stub shafts 369 (see Fig. 3), which are fixed at diametrically opposite points on the cup-shaped member 363, and are journalled in flanges on a lever 364. The lever 364 is pivoted on a shaft 365, which is journalled in a pair of ears bent up from the opposite sides of one end of a generally flat spring member 379. The other end of the spring member 379 is riveted, as at 395, to a plate 396 fixedly mounted in the casing 301. A bolt 397 passes through a nut 398, which is fixed to the casing 301 by any suitable means. The upper end of bolt 397 engages the under surface of spring member 379, which is self-biased into engagement with bolt 397. It will be seen that by turning the bolt 397, the the fulcrum point of the lever 364 may be moved upwardly or downwardly, thereby providing an additional means for adjusting the speed of shaft 302 at which lever 364 is actuated to its controlling position, as explained hereinafter.

The lever 364 extends from its pivot shaft 365 across the casing 301, spanning the shaft 302 and carrying a button 366 adapted to bear against the end of a clutch shaft 367, which is biased upwardly into engagement with the button 366 by means of a compression spring 368.

A portion of the shaft 302 is splined, as at 370, and a gear 371 mates with the splines 370. The gear 371 is rotatably mounted on the clutch shaft 367. Through a suitable gearing connection 400, shown in Figure 4, a second gear 372 also rotatably mounted on the clutch shaft 367 is driven in the opposite direction to the gear 371 and at a lower speed. It may be for example, that the gear 372 is driven at one-third the speed of the gear 371. The clutch shaft 367 also carries a double-faced clutch member 373, which is fixed on the said clutch shaft. Near its upper end, the clutch shaft carries a gear 374, which is also fixed on the clutch shaft, and which mates with a gear 375 fixed on a threaded shaft 376. An internally threaded nut 377 rides on the threaded shaft 376, and is moved therealong upon rotation of the shaft 376. The nut 377 carries a slider 401, shown in Figure 5, which engages the surface of a slidewire resistance 378 mounted to the right of the shaft 376 (as viewed in Figure 5). An extension 380 at the end of lever 364 lies in the path of the nut 377 at the lower end of its range of movement.

*Operation of velocity responsive control device*

As long as the angular velocity of the shaft 302 is below a predetermined value, determined by the force of spring 355 and the adjustment of bolt 397, the clutch shaft 367 is biased upwardly by the spring 368 so that clutch 373 engages gear 372. At such a time, the clutch shaft 367 is rotated in a direction so that the threaded shaft 376 rotates to carry the nut 377 downwardly. If the rotative speed of the shaft 302 remains below the predetermined value for a sufficient length of time, the nut 377 moves downwardly until it engages the extension 380 of the lever 364, whereupon the lever 364 is moved downwardly, carrying with it the clutch shaft 367 and causing disengagement of clutch 373 from the gear 372. Thereupon the clutch shaft 367 and the threaded shaft 376 are no longer rotated, and the slider carried by the nut 377 remains at the lower end of resistance 376.

If the angular velocity of the shaft 302 increases beyond the value determined by the compression of the spring 355, the centrifugal force acting on the weights 352 causes them to move outwardly, and the extensions 353 on the weights 352 to move the housing 354 downwardly, thereby carrying the lever 364 downwardly. This further downward movement of lever 364 causes the clutch shaft 367 to be moved downwardly, carrying the clutch 373 into engagement with gear 371. The clutch shaft 367 is thereupon rotated in such a direction that the threaded shaft 378 rotates in a direction to move the nut 377 upwardly, thereby moving the slider carried by nut 377 upwardly along the resistance 378.

An upward movement of this slider along resistance 378 corresponds to a movement of slider 264 of Figure 1 to the left along resistance 261.

Because of the difference in the speeds of rotation of the gears 371 and 372, it will be seen that the slider is moved rapidly upward whenever the speed exceeds the value determined by the compression of spring 355. On the other hand, when the speed is below that value, the slider is moved downward more slowly. The rapid upward movement insures a maximum of protection against overspeeding, while the slower downward movement prevents the initiation of a hunting condition after the speed has been reduced by operation of the slider upwardly.

The upward movement of the slider will normally be started when the velocity of the shaft 302 first exceeds the value determined by the compression of spring 365 so that the upward movement of the slider along resistance 378 will be at a predetermined rate determined by the velocity of the shaft and the extent of the gear reduction including gear 371. If the velocity should rise suddenly above the critical value, the rate of movement of the slider upwardly would be correspondingly increased. It would still, however, take place at a predetermined rate with respect to the angular velocity of shaft 302. Similarly, when the velocity again drops below the critical value, the slider starts moving downwardly so that the normal rate of movement of the slider downwardly is a predetermined one fixed by the critical value of the velocity and the extent of the gear reduction including gear 372. If the velocity is dropped suddenly, this predetermined rate may be reduced but is still predetermined with respect to the velocity of the shaft. Thus, it may properly be said that the slider moves upwardly at a predetermined rate and downwardly at a predetermined lower rate.

It may therefore be seen that as long as the angular velocity of shaft 302 remains below a predetermined value, the slider is maintained at the lower end of resistance 376. When it increases above that value, the slider is moved upwardly along the resistance 376. The position of the slider on the resistance 376 at any time is not determined by the angular velocity of the shaft 302 at that particular instant, but is determined by the length of time during which the angular velocity of the shaft 302 has been above that predetermined value, and by the particular variations in angular velocity of shaft 302 which have taken place since it first exceeded that predetermined value. The position of the slider along the resistance 378 is therefore determined by a time function of the velocity of shaft 302, integrated over the entire interval during which that velocity is greater than a predetermined value.

It has been found, that in an intake manifold pressure control system of the type described, the use of such a controller, which operates in accordance with an integrated function of the velocity of the compressor, provides a control which effectively limits the angular velocity of the compressor without establishing a definite and absolute limit.

A limit control of the type described effectively prevents the limiting condition from rising above a predetermined value, but nevertheless under any given set of conditions, permits a further increase in the limiting condition, and thereby prevents sudden unbalancing effects in the system which might cause undesirable hunting conditions to be established.

While I have shown and described certain preferred embodiment of my invention, it will be readily understood that modifications thereof will readily appear to those who are skilled in the art, and I therefore wish to be limited only by the scope of the appended claims.

I claim as my invention:

1. Apparatus for controlling the pressure of the air supplied to the intake manifold of an internal combustion engine provided with a turbine-driven compressor powered by exhaust gases from said engine, comprising in combination, a modulatingly variable control device, means including said device for controlling the speed of said compressor, and means responsive to the speed of said compressor for operating said control device at a predetermined rate in a speed decreasing sense as long as said compressor speed exceeds a predetermined range of values and at a relatively low predetermined rate in the opposite sense as long as said compressor speed is below said predetermined range of values and until said control device assumes a normal position.

2. Apparatus for controlling the pressure of the air supplied to the intake manifold of an internal combustion engine provided with a turbine-driven compressor powered by exhaust gases from said engine, comprising in combination, a first control device responsive to the pressure of the air supplied to said intake manifold, means including an electrically controlled motor for controlling the speed of said compressor, a current controlling device for controlling said motor, means including said first control device for controlling said current controlling device to in turn control said motor, a second control device associated with said current controlling device and movable from a normal position in a direction such that it increasingly causes said current controlling device to reduce the speed of said compressor as it is moved away from said position, and means responsive to the speed of said compressor for operating said second control device at a predetermined rate in a speed-decreasing sense when said compressor speed exceeds a predetermined range of values and at a relatively low rate in the opposite sense when said compressor speed falls below said predetermined range of values.

3. Apparatus for controlling the pressure of the air supplied to the intake manifold of an internal combustion engine provided with a turbine-driven compressor powered by exhaust gases from said engine, comprising in combination, means including an electrical network for controlling the speed of said compressor, a first control device responsive to the pressure of the air supplied to said intake manifold, first variable impedance means connected in said network and operated by said first control device, second variable impedance means connected in said network and having a normal value, and means responsive to the speed of said compressor for operating said second variable impedance means at a predetermined rate away from said normal value in a speed-decreasing sense when said compressor speed exceeds a predetermined range of values and at a relatively low rate in the opposite sense when said compressor speed falls below said predetermined range of values.

4. Apparatus for controlling the pressure of the air supplied to the intake manifold of an internal combustion engine provided with a turbine-driven compressor powered by exhaust gases from said engine, comprising in combination, means for controlling the speed of said compressor, motor means for driving said speed controlling means, a balanceable electrical network, means responsive to unbalance of said network for controlling said motor means, a first control device responsive to the pressure of the air supplied to said intake manifold, first variable impedance means connected in said network and operated by said first control device to unbalance said network upon a change in said pressure, second variable impedance means connected in said network and having a normal value, means responsive to the speed of said compressor for operating said second variable impedance means to unbalance said network at a predetermined rate in a speed-decreasing sense when said compressor speed exceeds a predetermined range of values and at a relatively low rate in the opposite sense when said compressor speed falls below said predetermined range of values, and further variable impedance means driven by said motor means concurrently with said speed controlling means for rebalancing said network.

5. Apparatus for controlling the pressure of the air supplied to the intake manifold of an internal combustion engine provided with a turbine-driven compressor powered by exhaust gases from said engine, comprising in combination, means including an electrically controlled motor for controlling the speed of said compressor, a current controlling device for controlling said motor, a control device, means including said control device for controlling said current controlling device to in turn control said motor, said control device being movable from a normal position in a direction such that it acts increasingly to reduce the speed of said compressor as it is moved away from said position, and means responsive to the speed of said compressor for operating said control device at a predetermined rate in a speed-decreasing sense when said compressor speed exceeds a predetermined range of values and at a relatively low rate in the opposite sense when said compressor speed falls below said predetermined range of values.

DANIEL G. TAYLOR.